United States Patent [19]

Kitahara et al.

[11] Patent Number: 5,684,540
[45] Date of Patent: Nov. 4, 1997

[54] VIDEO SIGNAL DECODING APPARATUS FOR USE WITH VARYING HELPER SIGNAL LEVELS

[75] Inventors: Toshiaki Kitahara, Ibaraki; Yutaka Nio, Osaka, both of Japan

[73] Assignee: Matsushita Electric Industrial Co., Ltd., Osaka, Japan

[21] Appl. No.: 510,906

[22] Filed: Aug. 3, 1995

[30] Foreign Application Priority Data

Aug. 8, 1994 [JP] Japan .................................. 6-185548

[51] Int. Cl.⁶ .................................................. H04N 11/20
[52] U.S. Cl. ...................................... 348/432; 348/474
[58] Field of Search ................................ 348/432, 474, 348/913, 426, 433; H04N 7/01, 11/20

[56] References Cited

U.S. PATENT DOCUMENTS

| | | | |
|---|---|---|---|
| 4,855,824 | 8/1989 | Fuhrer ........................... | 348/432 |
| 5,216,505 | 6/1993 | Kageyama et al. ............. | 348/474 |
| 5,225,907 | 7/1993 | Casavant et al. ............... | 348/432 |
| 5,384,599 | 1/1995 | Casavant et al. ............... | 348/432 |

*Primary Examiner*—Victor P. Kostak
*Attorney, Agent, or Firm*—Ratner & Prestia

[57] ABSTRACT

A video signal is reproduced by adjusting the amplitude of a horizontal high frequency signal, a vertical high frequency signal and a vertical temporal high frequency signal. Helper signals can be demodulated even if the helper signal levels vary due to receiving conditions. The number of circuits can be reduced by using a common circuit for amplitude adjustment of the helper signal and for automatic color control of a chrominance signal.

7 Claims, 12 Drawing Sheets

VIDEO SIGNAL DECODING APPARATUS FOR USE WITH VARYING HELPER SIGNAL LEVELS

BACKGROUND OF THE INVENTION

1. Field of the Invention

The present invention relates to a video signal decoding apparatus used in a receiver for a second generation extended definition television (EDTV-2) system and is appropriate in applying when each helper signal level of a vertical high frequency component, a vertical temporal high frequency component and a horizontal high frequency component vary due to drift of a receiving wave, mismatching of an antenna system or the like.

2. Description of the Prior Art

Recently, in Japan, a provisional standard for an EDTV-2 system has been established in December, 1993, succeeding a first generation EDTV system.

Figure 1:
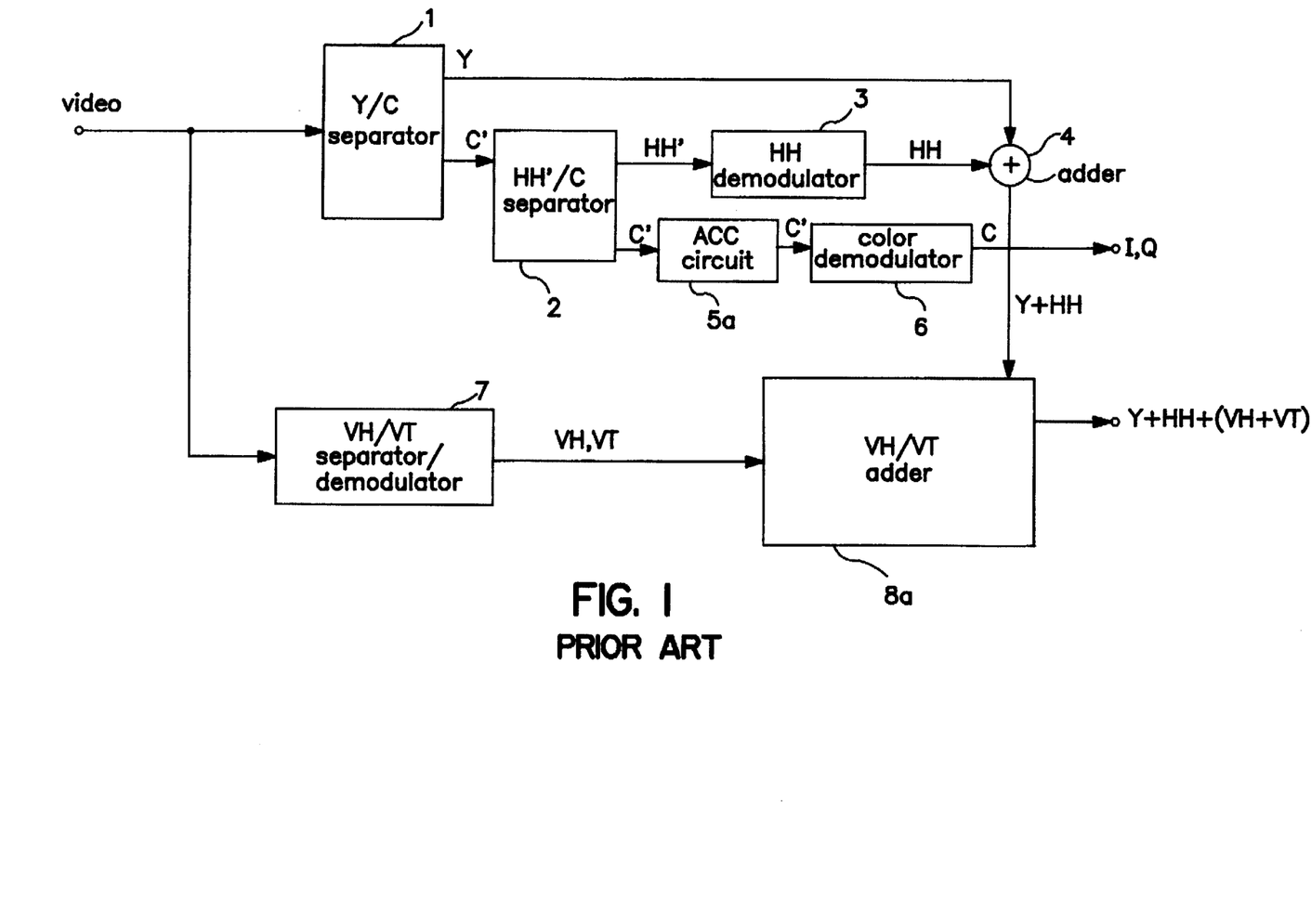
FIG. 1 is a block diagram of a video signal decoding apparatus in accordance with the prior art.

An example of a video signal decoding apparatus for the provisional standard of the EDTV-2 system in accordance with the prior art is shown in FIG. 1.

An input video signal is separated into a luminance signal Y and a chrominance signal C at a Y/C separation circuit 1. In an EDTV-2 system, the separated chrominance signal includes a horizontal resolution helper signal (HH') multiplexed at a conjugated position with an ordinary chrominance signal. The separated chrominance signal is separated into a horizontal resolution helper signal HH' and a chrominance signal including a color burst signal at a horizontal resolution helper signal/chrominance signal separation circuit (HH'/C separation circuit) 2.

The HH' signal is demodulated at a horizontal high frequency signal demodulation circuit (HH demodulation circuit) 3 and is superimposed on the luminance signal Y at an adder 4. The chrominance signal separated at HH'/C separation circuit 2 is supplied to an automatic color control circuit (ACC circuit) 5a, ACC circuit 5a detects a color burst signal from the chrominance signal, the amplitude of the chrominance signal is automatically adjusted according to the amplitude of the detected color burst signal. The amplitude adjusted chrominance signal is demodulated into a color signal at a color demodulation circuit 6 and is outputted as I and Q signals.

A vertical high frequency signal (VH signal) and a vertical temporal resolution helper signal (VT signal) multiplexed during an upper/lower non-picture period of the input video signal are separated and demodulated at a vertical high frequency signal/vertical temporal resolution helper signal separation and demodulation circuit (VH/VT separation/demodulation circuit) 7. A VH/VT adder 8a superimposes VH and VT signals coming from VH/VT separation/demodulation circuit 7 on a luminance signal coming from adder 4 and superimposing an HH signal and outputs a luminance signal with enhanced resolution both in horizontal and vertical.

In an EDTV-2 system, a vertical resolution helper signal VH' and a vertical temporal resolution helper signal VT are multiplexed during an upper/lower non-picture period of a video signal and a horizontal resolution helper signal HH' is multiplexed during a picture period.

At an ordinary reception of a television signal, however, the chrominance signal level could vary more than the luminance signal level due to drift of a receiving wave, mismatching of an antenna system or the like. In this case, the levels of the HH signal and the VH and VT signals which are modulated and multiplexed like as a chrominance signal vary similarly and the demodulated video signal is reproduced in a different form from a signal originally transmitted.

The present invention aims to solve the above problem and offers a video signal decoding apparatus for an EDTV-2 system which can reproduce an optimum picture by automatically adjusting the levels of an HH signal and VH and VT signals which levels vary due to receiving condition.

SUMMARY OF THE INVENTION

To solve the above problem, means for detecting an amplitude of a color burst signal and automatically adjusting the levels of the HH signal and the VH and VT signals using a gain control signal according to the color burst signal amplitude.

An optimum picture can be obtained by detecting an amplitude of a color burst signal and automatically adjusting the amplitude of the HH' signal or the VH' and VT signals which varies due to receiving condition using a gain control signal according to the color burst signal amplitude.

DETAILED DESCRIPTION OF THE INVENTION (First exemplary embodiment)

Figure 2:
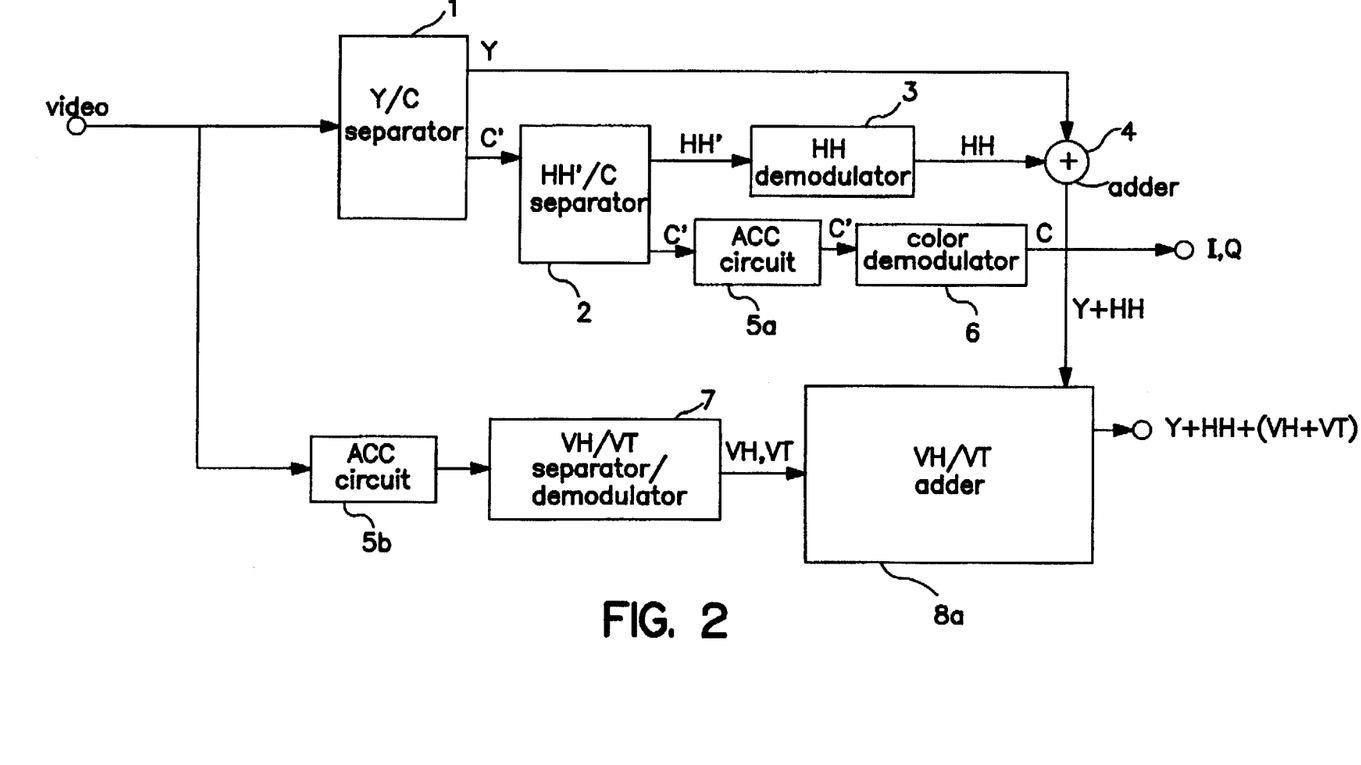
FIG. 2 is a block diagram of a video signal decoding apparatus in accordance with a first exemplary embodiment of the present invention.

FIG. 2 is a block diagram of a video signal decoding apparatus for an EDTV-2 system in accordance with a first exemplary embodiment of the present invention. The blocks having similar functions to those in FIG. 1 are numbered with the same reference numbers.

An input video signal is separated into a luminance signal Y and a chrominance signal C multiplexed with an HH' signal at a Y/C separation circuit 1. The chrominance signal multiplexed with an HH' signal is separated into an HH' signal and a chrominance signal at an HH'/C separation circuit 2. The HH' signal is demodulated into an HH signal at an HH demodulation circuit 3 and is superimposed to the luminance signal coming from Y/C separation circuit 1 at an adder 4. An first ACC circuit 5a is inputted with the chrominance signal and detects a color burst signal in the input chrominance signal and automatically adjusts an amplitude of the chrominance signal according to the detected color burst signal amplitude. The amplitude adjusted chrominance signal from ACC circuit 5a is demodulated into color signals at a color demodulation circuit 6 and they are outputted as I and Q signals.

VH and VT signals in the input video signal which are modulated and multiplexed during an upper/lower non-picture period are amplitude adjusted at a second ACC circuit 5b and are separated and demodulated into VH and VT signals at a VH/VT separation/demodulation circuit 7. The demodulated VH and VT signals are superimposed on the luminance signal coming from adder 4 and superimposing an HH signal at VH/VT adder 8a. VH/VT adder 8a outputs a luminance signal with enhanced resolution both in horizontal and vertical.

Thus, optimum VH and VT signals can be demodulated by adding a new ACC circuit 5b even if the VH and VT signal levels vary due to receiving condition or the like.

(Second exemplary embodiment)

Figure 3:
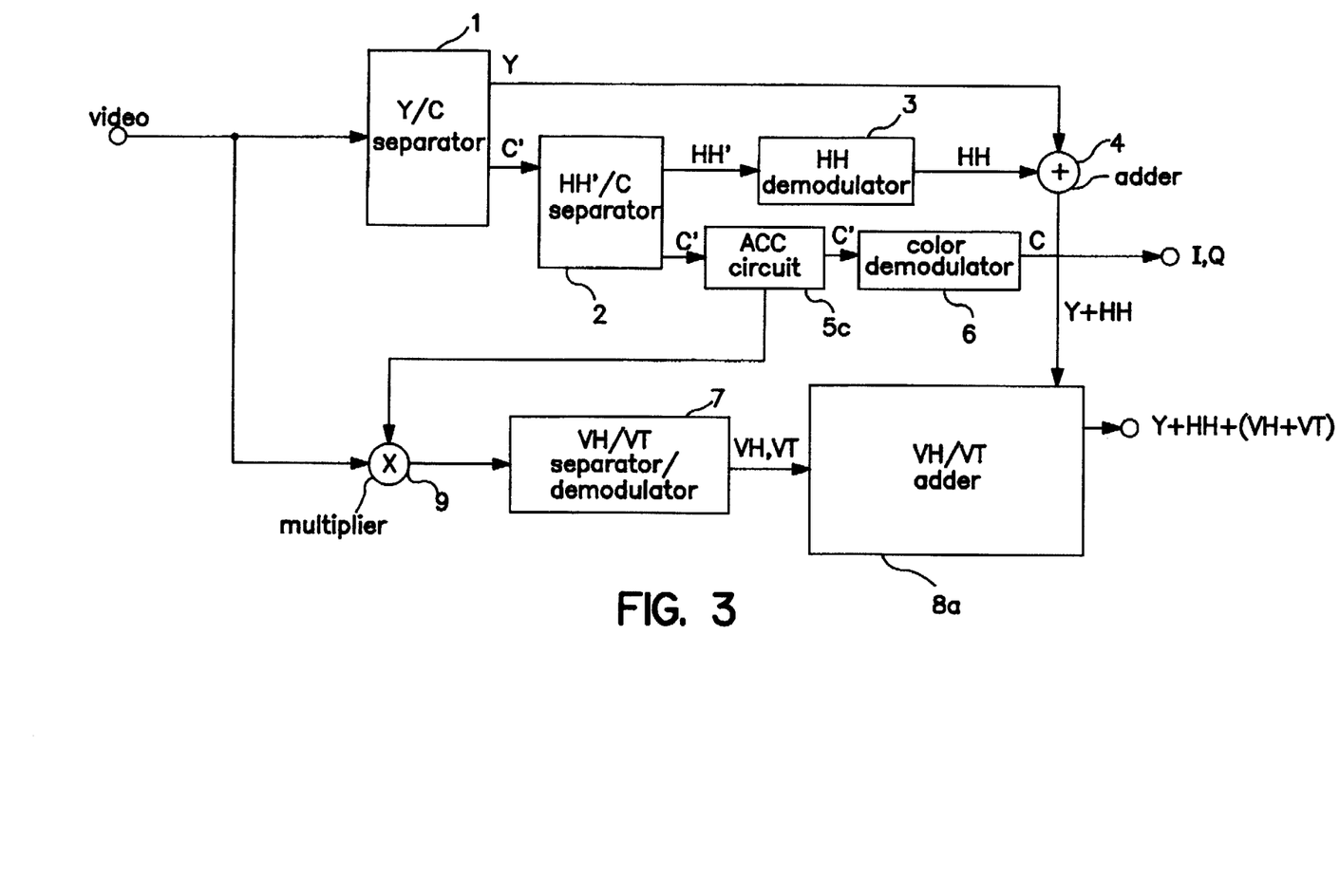
FIG. 3 is a block diagram of a video signal decoding apparatus in accordance with a second exemplary embodiment of the present invention.

FIG. 3 is a block diagram of a video signal decoding apparatus for an EDTV-2 system in accordance with a second exemplary embodiment of the present invention. The different point from a video signal decoding apparatus in accordance with the first exemplary embodiment of the present invention is that a level of a modulated and multiplexed VH and VT signals are adjusted using an ACC circuit inserted for a chrominance signal.

An input video signal is separated at a Y/C separation circdit 1 into a luminance signal Y and a chrominance signal multiplexed with an HH' signal. The chrominance signal multiplexed with an HH' signal is separated into an HH' signal and a chrominance signal at an HH'/C separation circuit 2. The HH' signal is demodulated into an HH signal at an HH demodulation circuit 3 and is superimposed on the luminance signal coming from Y/C separation circuit 1 at an adder 4. An ACC circuit 5c having a gain control function detects a color burst signal included in the chrominance signal and automatically adjusts an amplitude of the chrominance signal coming from HH'/C separation circuit 2 according to the amplitude of the detected color burst signal. The amplitude adjusted chrominance signal from ACC circuit 5c is demodulated into color signals at a color demodulation circuit 6 and they are outputted as I and Q signals.

ACC circuit 5c outputs a gain control signal proportional to the detected color burst signal amplitude. VH' and VT' signals multiplexed during an upper/lower non-picture period of the input video signal are amplitude adjusted by the gain control signal from ACC circuit 5c at a multiplier 9 and then is separated and demodulated into VH and VT signals at a VH/VT separation/demodulation circuit 7. The demodulated VH and VT signals are superimposed on the luminance signal coming from adder 4 and superimposed with an HH signal at a VH/VT adder 8a and is outputted as a luminance signal with enhanced resolution both in horizontal and vertical.

Thus, an optimum VH and VT signals can be obtained, even if the levels of the VH and VT signals vary due to receiving condition or the like. The number of circuits can be reduced by using a common ACC circuit for amplitude adjustment of the VH and VT signals and automatic color control.

(Third exemplary embodiment)

Figure 4:
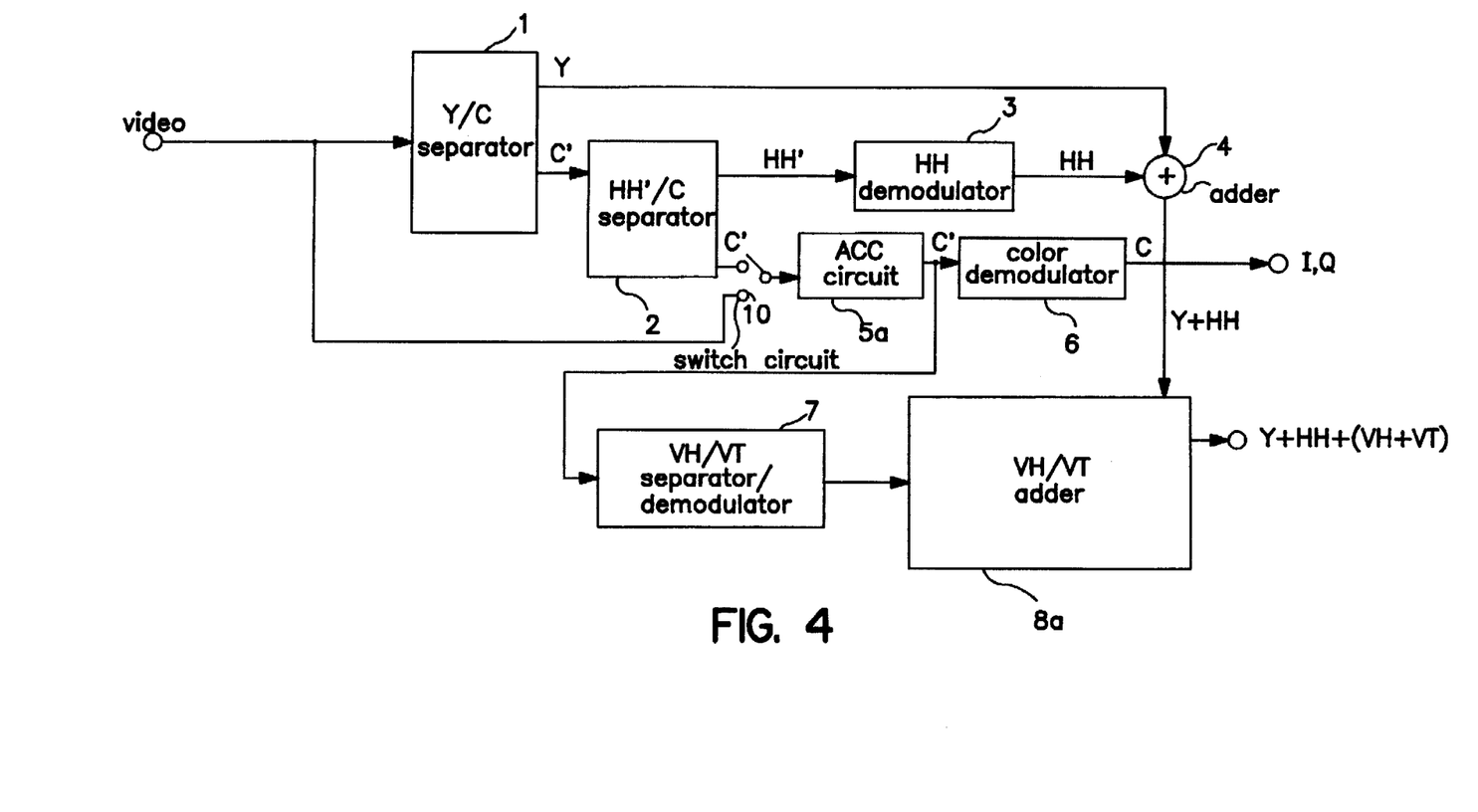
FIG. 4 is a block diagram of a video signal decoding apparatus in accordance with a third exemplary embodiment of the present invention.

FIG. 4 is a block diagram of a video signal decoding apparatus for an EDTV-2 system in accordance with a third exemplary embodiment of the present invention. The different point from a video signal decoding apparatus in accordance with the first exemplary embodiment of the present invention is that the amplitude is adjusted both for a chrominance signal and for modulated and multiplexed VH and VT signals by switching a video signal for a picture period and for an upper/lower non-picture period and inputting it to an ACC circuit.

An input video signal is separated at a Y/C separation circuit 1 into a luminance signal Y and a chrominance signal C multiplexed with an HH' signal. The chrominance signal multiplexed with an HH' signal is separated into an HH' signal and a chrominance signal C at an HH'/C separation circuit 2. The HH' signal is demodulated into an HH signal at an HH demodulation circuit 3 and is superimposed on the luminance signal Y coming from Y/C separation circuit i at an adder 4.

The switch circuit 10 selects a chrominance signal separated at HH'/C separation circuit 2 during a picture period and selects the input video signal during an upper/lower non-picture period and provides them to a following ACC circuit 5a. ACC circuit 5a detects an color burst signal, automatically adjusts the amplitude of the input video signal according to the amplitude of the detected color burst signal and outputs an amplitude adjusted chrominance signal. The amplitude adjusted chrominance signal is demodulated into color signals at a color demodulation circuit 6 and they are outputted as I and Q signals. The amplitude adjusted chrominance signal coming from ACC circuit 5a is demodulated into VH and VT signals at a VH/VT separation/demodulation circuit 7 and is superimposed on the luminance signal Y coming from adder 4 and superimposing with an HH signal at a VH/VT adder 8a and is outputted as a luminance signal with enhanced resolution both in horizontal and vertical.

Thus, an optimum VH and VT signals can be demodulated, even if the levels of the VH and VT signals vary due to receiving condition or the like. The number of circuits can be reduced by using a common ACC circuit 5a both for amplitude adjustment of the VH/VT signal and for automatic color control.

(Fourth exemplary embodiment)

Figure 5:
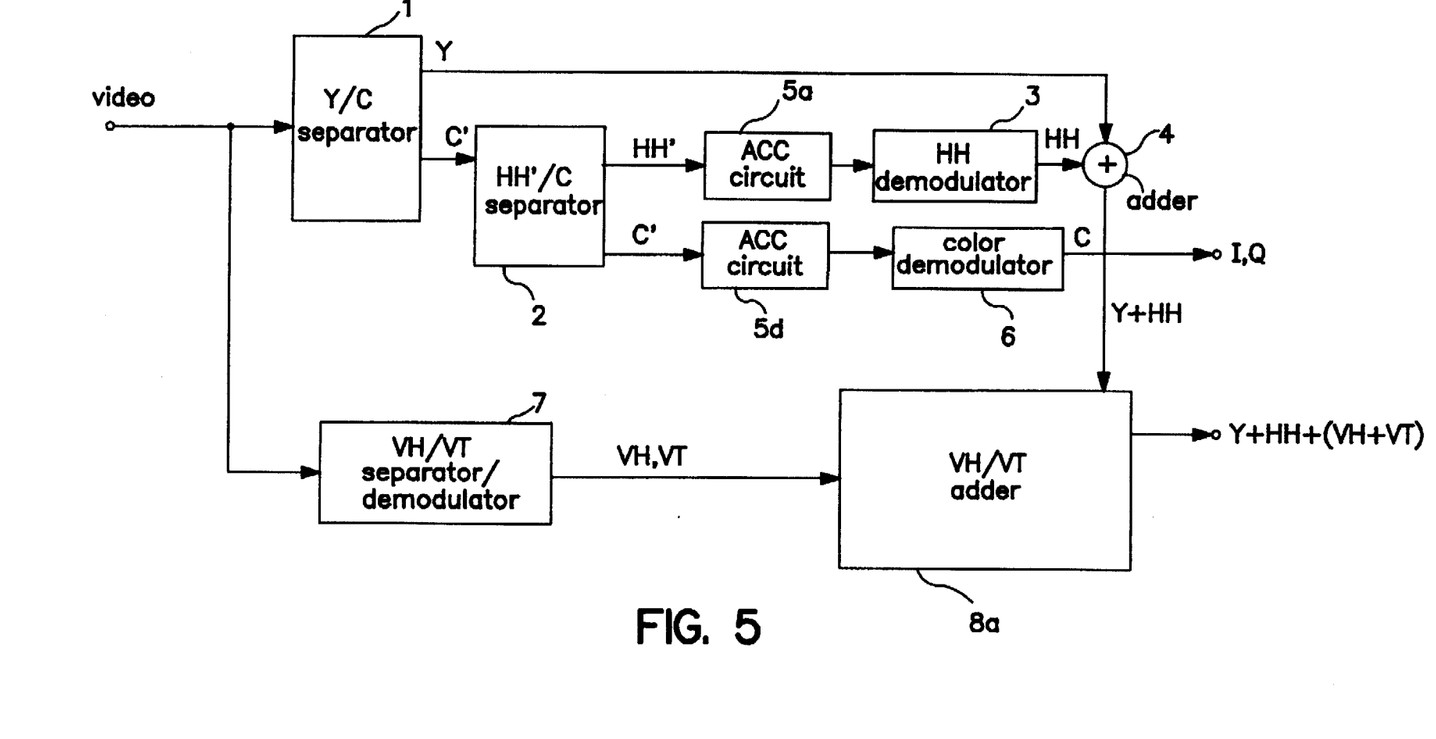
FIG. 5 is a block diagram of a video signal decoding apparatus in accordance with a fourth exemplary embodiment of the present invention.

FIG. 5 is a block diagram of a video signal decoding apparatus for an EDTV-2 system in accordance with a fourth exemplary embodiment of the present invention.

An input video signal is separated at a Y/C separation circuit 1 into a luminance signal Y and a chrominance signal C multiplexed with an HH' signal. The chrominance signal multiplexed with an HH' signal is separated into an HH' signal and a chrominance signal at an HH'/C separation circuit 2. A first ACC circuit 5a is inputted with the chrominance signal and detects a color burst signal included in the input chrominance signal and automatically adjusts an amplitude of the chrominance signal according to the detected color burst signal amplitude. The amplitude adjusted chrominance signal is demodulated into an HH signal at an HH signal demodulator 3 and is superimposed on the luminance signal coming from Y/C separation 1 at an adder 4. The chrominance signal separated at HH'/C separation circuit 2 is automatically amplitude adjusted at a second ACC circuit 5d and is demodulated into color signals at a color demodulation circuit 6 and they are outputted as I and Q signals.

VH and VT signals are separated and demodulated from the input video signal at a VH/VT separation/demodulation circuit 7. The demodulated VH and VT signals are superimposed on the luminance dignal coming from adder 4 and superimposing with an HH signal at a VH/VT adder 8a and is outputted as a luminance signal with enhanced resolution both in horizontal and vertical.

Thus, an optimum HH signal can be obtained, even if the HH signal level varies due to receiving condition or the like.

(Fifth exemplary embodiment)

Figure 6:
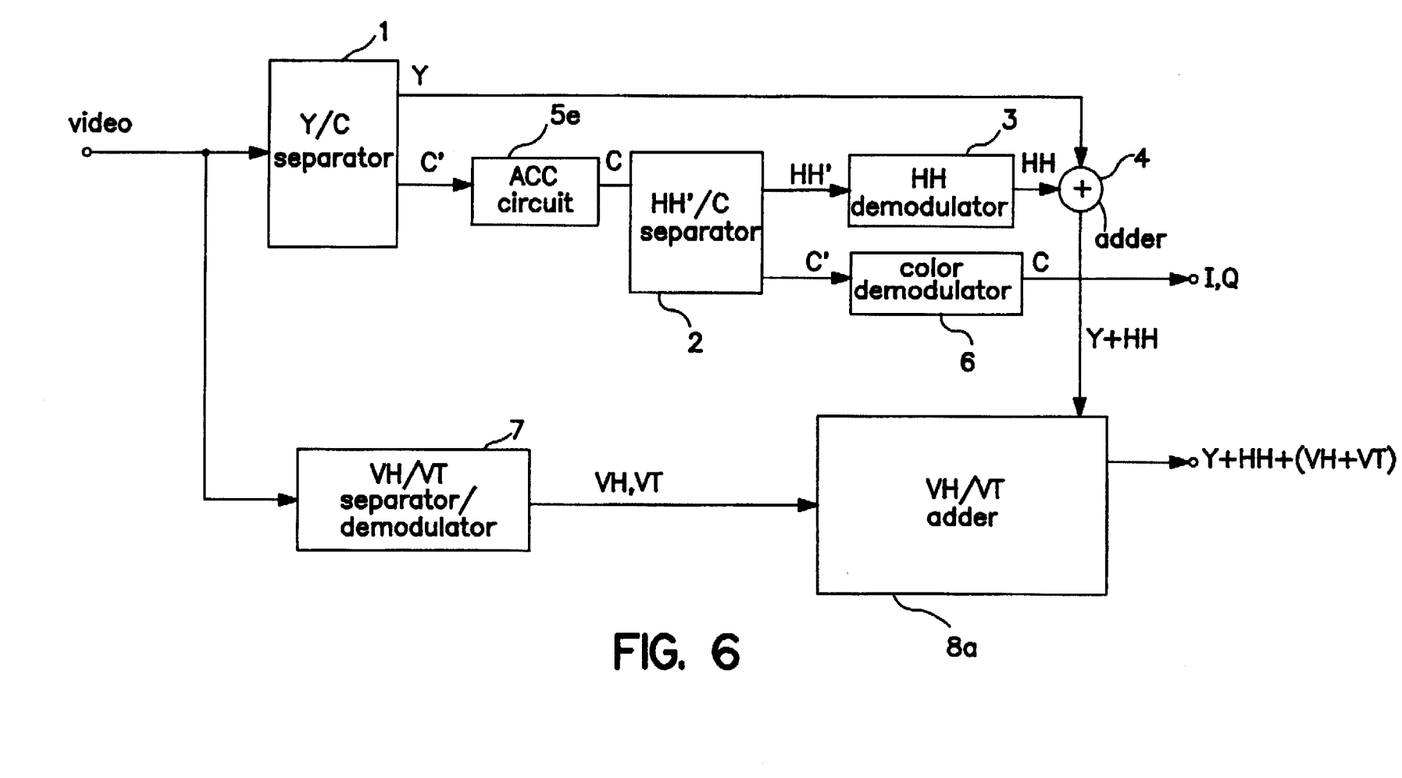
FIG. 6 is a block diagram of a video signal decoding apparatus in accordance with a fifth exemplary embodiment of the present invention.

FIG. 6 is a block diagram of a video signal decoding apparatus for an EDTV-2 system in accordance with a fifth exemplary embodiment of the present invention. The different point from a video signal decoding apparatus in accordance with the fourth exemplary embodiment of the present invention is that the amplitudes are adjusted for both of a chrominance signal and an HH' signal by putting an ACC circuit ahead of an HH'/C separation circuit.

An input video signal is separated at a Y/C separation circuit 1 into a luminance signal and a chrominance signal multiplexed with an HH' signal. An ACC circuit 5e detects a color burst signal included in the chrominance signal separated at Y/C separation circuit 1 and automatically adjusts the amplitude of the input chrominance signal according to the amplitude of the detected color burst signal. The amplitude adjusted chrominance signal is then separated into an HH' signal and a chrominance signal at an HH'/C separation circuit 2. The HH' signal is demodulated into an HH signal at an HH demodulation circuit 3 and is superimposed on the luminance signal coming from Y/C separation circuit 1 at an adder 4. The chrominance signal separated at HH'/C separation circuit 2 is demodulated into color signals at a color demodulation circuit 6 and they are outputted as I and Q signals.

The input video signal is separated and demodulated into VH and VT signals at a VH/VT demodulation circuit 7. The demodulated VH and VT signals are superimposed on the luminance signal coming from adder 4 and superimposing with an HH signal and is outputted as a luminance signal with enhanced resolution both in horizontal and vertical.

Thus, an optimum HH signal can be obtained, even if the HH signal level varies due to receiving condition or the like. The number of circuits can be reduced by using a common ACC circuit for amplitude adjustment of the HH' signal and for automatic color control.

(Sixth exemplary embodiment)

Figure 7:
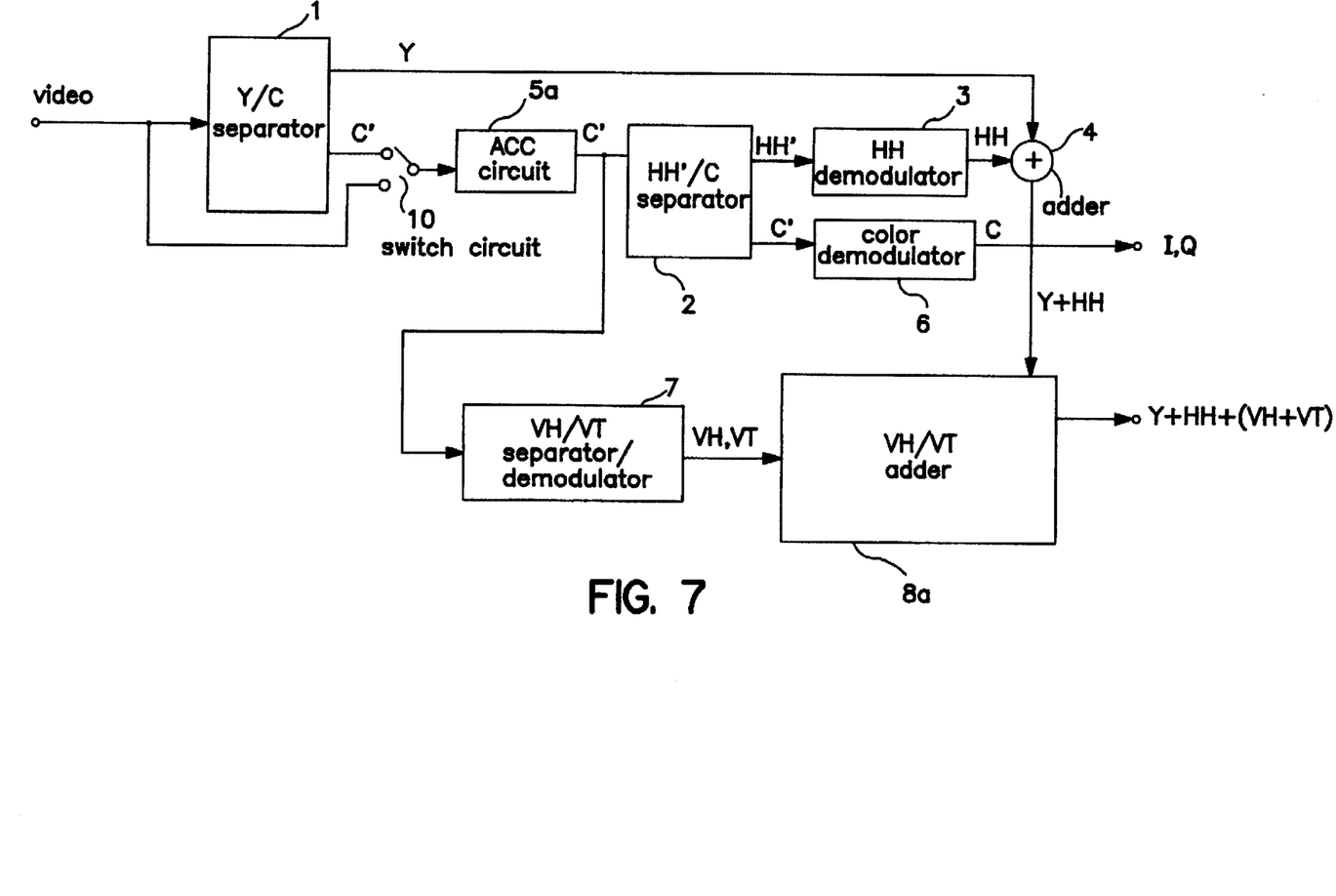
FIG. 7 is a block diagram of a video signal decoding apparatus in accordance with a sixth exemplary embodiment of the present invention.

It is possible to combine either one of the first, the second or the third exemplary embodiment and either one of the fourth or the fifth exemplary embodiment. An example is shown in FIG. 7, which is a combination of the third exemplary embodiment and the fifth exemplary embodiment.

An input video signal is separated at a Y/C separation circuit 1 into a luminance signal and a chrominance signal multiplexed with an HH' signal. A switch circuit 10 selects the input video signal during a picture period and a chrominance signal multiplexed with the HH' signal during an upper/lower non-picture period. Then, an ACC circuit 5a detects a color burst signal included in the input signal and automatically adjusts the amplitude of the input signal according to the amplitude of the detected color burst signal.

The amplitude adjusted chrominance signal is separated into an HH' signal and a chrominance signal at an HH'/C separation circuit 2. The separated HH' signal is demodulated into an signal at an HH demodulation circuit 3 and is superimposed on the luminance signal from Y/C separation circuit 1 at an adder 4. The chrominance signal separated at HH'/C separation circuit 2 is demodulated into color signals at a color demodulation circuit 6 and they are outputted as I and Q signals.

The VH/VT signal which was amplitude adjusted at ACC circuit 5a is separated and demodulated into VH and VT signals at VH/VT separator/demodulator 7. The demodulated VH and VT signals are superimposed on the luminance signal from adder 4 and is outputted as a luminance signal with enhanced resolution both in horizontal and vertical.

Thus, optimum HH, VH and VT signals can be obtained, even if the levels of the HH' signal and the VH/VT signal vary due to receiving condition or the like. The number of circuits can be reduced by using a common ACC circuit 5a for amplitude adjustment of the HH signal and the VH and VT signals and for automatic color control.

(Seventh exemplary embodiment)

Figure 8:
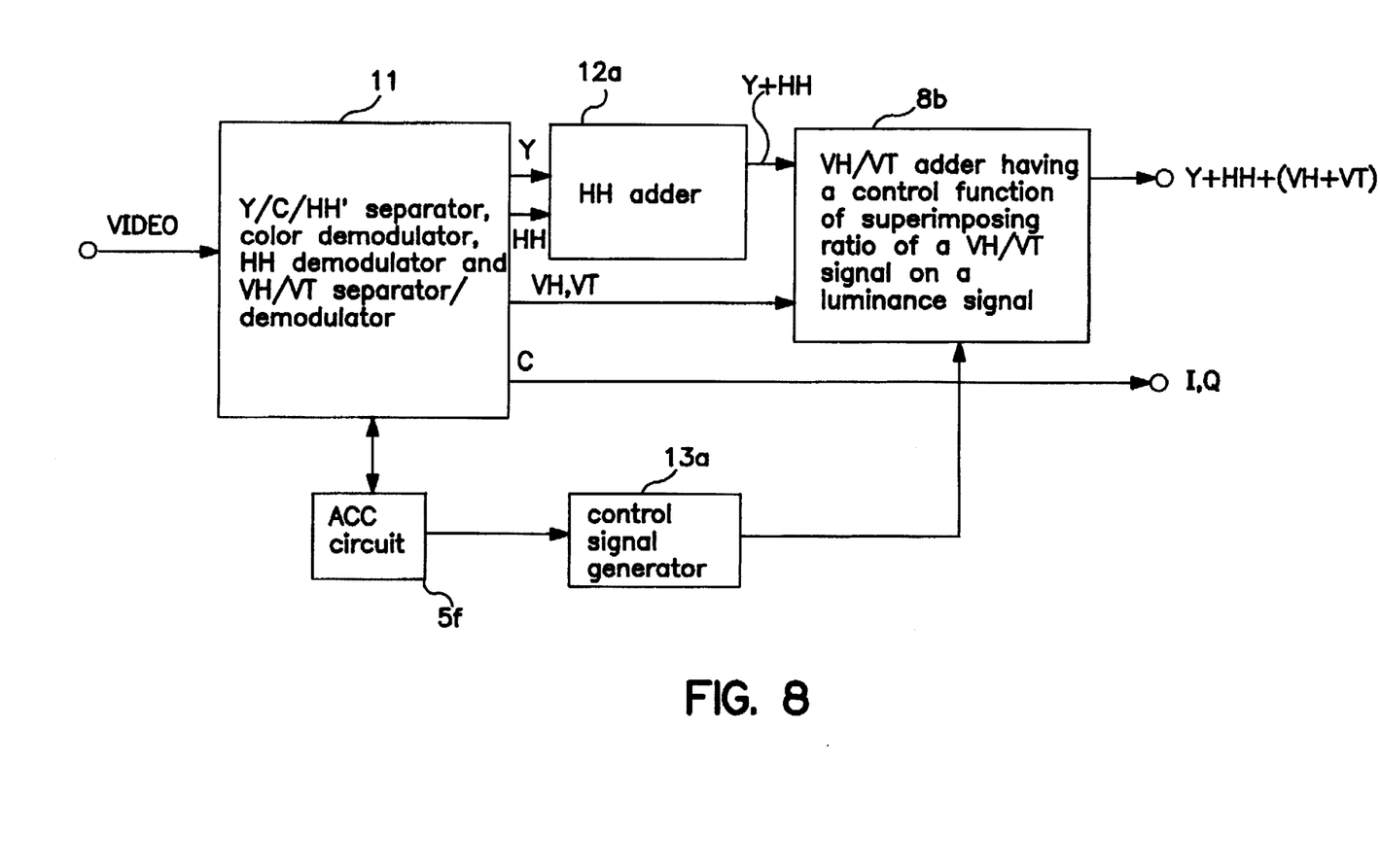
FIG. 8 is a block diagram of a video signal decoding apparatus in accordance with a seventh exemplary embodiment of the present invention.

FIG. 8 is a block diagram of a video signal decoding apparatus for an EDTV-2 system in accordance with a seventh exemplary embodiment of the present invention.

An input video signal is separated into a luminance signal, an HH signal, a chrominance signal, a VH signal and a VT signal at a block 11 which executes Y/C/HH separation, HH demodulation and VH/VT demodulation and processed signals are outputted. The outputted HH signal is superimposed on the luminance signal at an HH adder 12a having on/off function of HH signal decoding and is outputted.

The VH and VT signals from the circuit 11 are superimposed on the luminance signal superimposed with an HH signal and coming from HH adder 12a at a VH/VT adder 8b having on/off function of superposition for the VH and VT signals. The superimposed signal is outputted as a luminance signal with enhanced resolution both in horizontal and vertical.

ACC circuit 5f detects a color burst signal included in the input signal and outputs a chrominance signal which amplitude is automatically adjusted. Control signal generator 13a generates a control signal according to the output of ACC circuit 5f. The control signal controls the decoding process for the VH and VT signals from circuit 11 at VH/VT adder 8b.

Thus, in the case in which the levels of the VH and VT signals are almost same as the noise level due to bad receiving condition or the like, the apparatus judges to be difficult to reproduce an original signal and controls a superimposing ratio of the VH and VT signals on the video signal.

Figure 9:
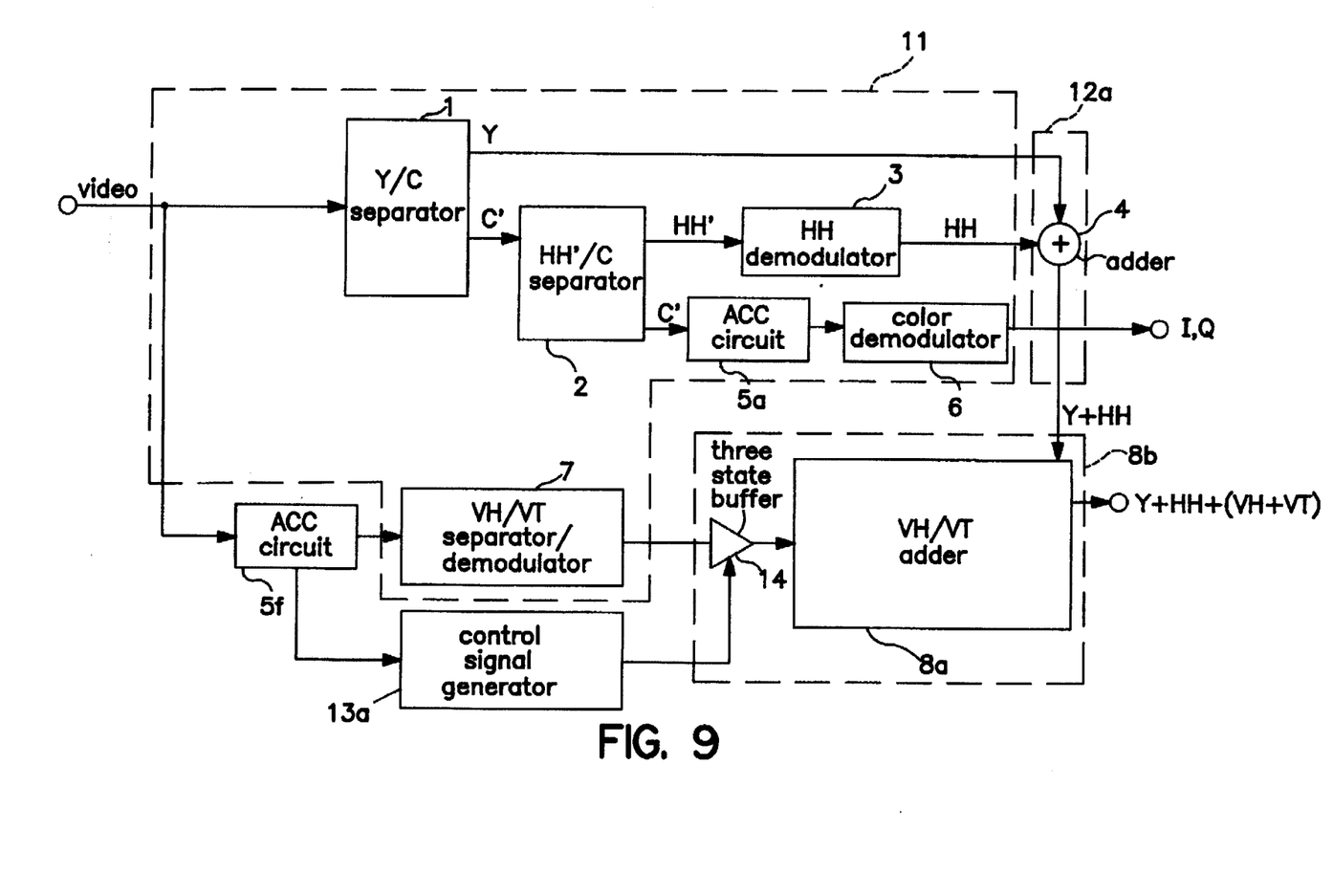
FIG. 9 is a block diagram of an example of separation/demodulation block of a video signal decoding apparatus in accordance with the seventh exemplary embodiment of the present invention.

FIG. 9 shows an example applying the sixth exemplary embodiment for the circuit configuration of the first exemplary embodiment shown in FIG. 2. An on/off action of the VH and VT signals are executed by the control signal from control signal generator 13a at a three-state-buffer 14. Instead of using a three-state-buffer 14, a superimposing ratio of the VH and VT signals on the video signal may be varied by a control signal from control signal generator 13a.

(Eighth exemplary embodiment)

Figure 10:
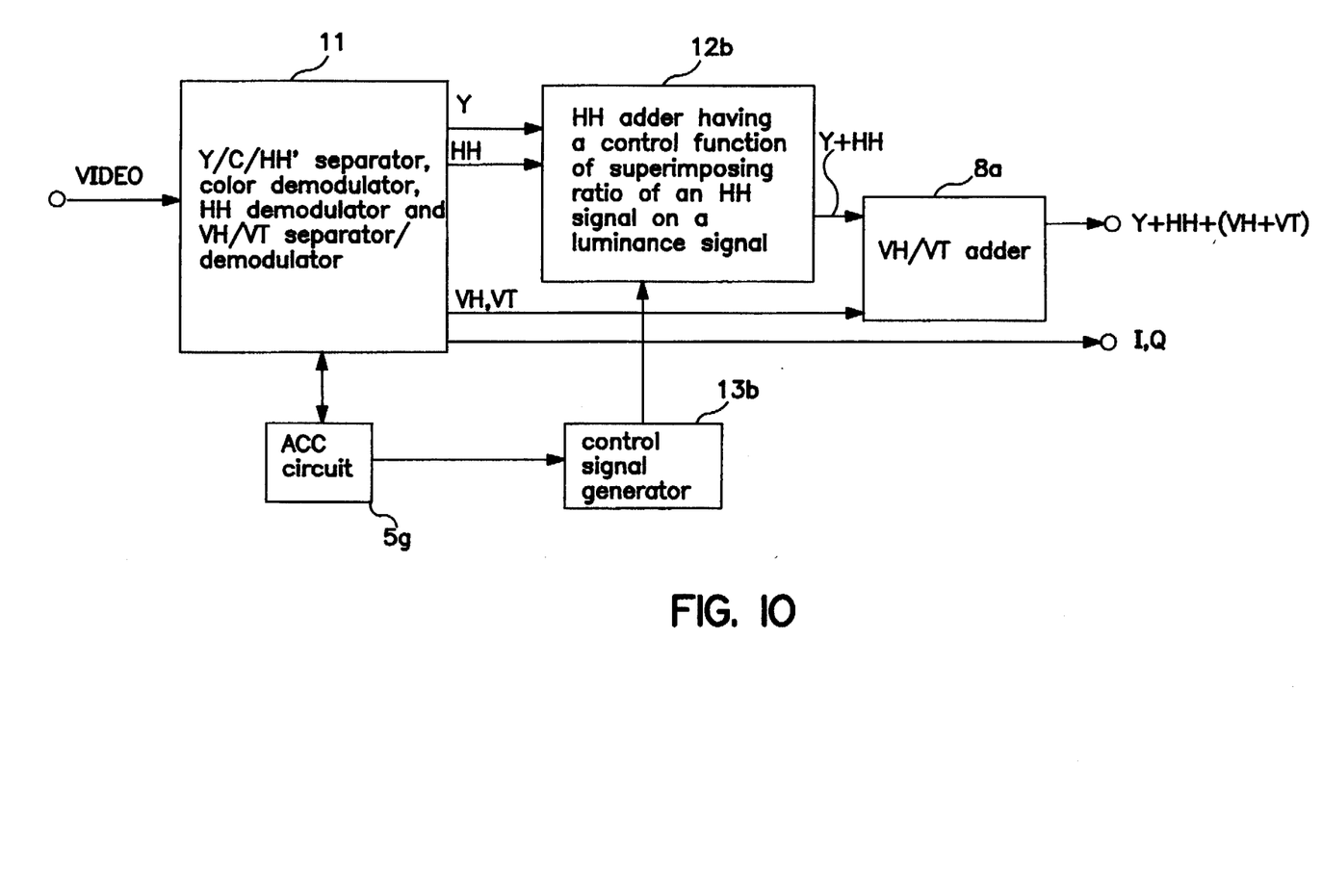
FIG. 10 is a block diagram of a video signal decoding apparatus in accordance with a eighth exemplary embodiment of the present invention.

FIG. 10 is a block diagram of a video signal decoding apparatus for an EDTV-2 system in accordance with an eighth exemplary embodiment of the present invention.

An input video signal is separated into a luminance signal, an HH signal, a chrominance signal, a VH signal and a VT signal at a block 11 which executes Y/C/HH separation, HH demodulation and VH/VT demodulation and the processed signals are outputted. The HH signal from separator/demodulator 11 is superimposed on the luminance signal from separator/demodulator 11 at an HH adder 12b. Separator/demodulator 11 includes ACC circuit 5a and color demodulator 6 and outputs I and Q color signals which amplitudes are automatically adjusted.

The VH and VT signals from separator/demodulator 11 are superimposed on the luminance signal superimposed with an HH signal coming from adder 12b at VH/VT adder 8a and is outputted as a luminance signal with enhanced resolution both in horizontal and vertical.

ACC circuit 5g detects a color burst signal included in the chrominance signal and outputs a chrominance signal which amplitude is automatically adjusted. Control signal generator 13b generates a control signal according to the amplitude of the color burst signal detected at ACC circuit 5g. The HH signal from separator/demodulator 11 is superimposed on the luminance signal from separator/demodulator 11 at HH adder 12b. At the same time, a superimposing ratio is controlled by a control signal from control signal generator 13b.

Thus, in the case in which the HH signal level is almost same as the noise level due to bad receiving condition or the like, the apparatus judges to be difficult to reproduce an original signal and controls a superimposing ratio of the HH signal on the video signal.

Figure 11:
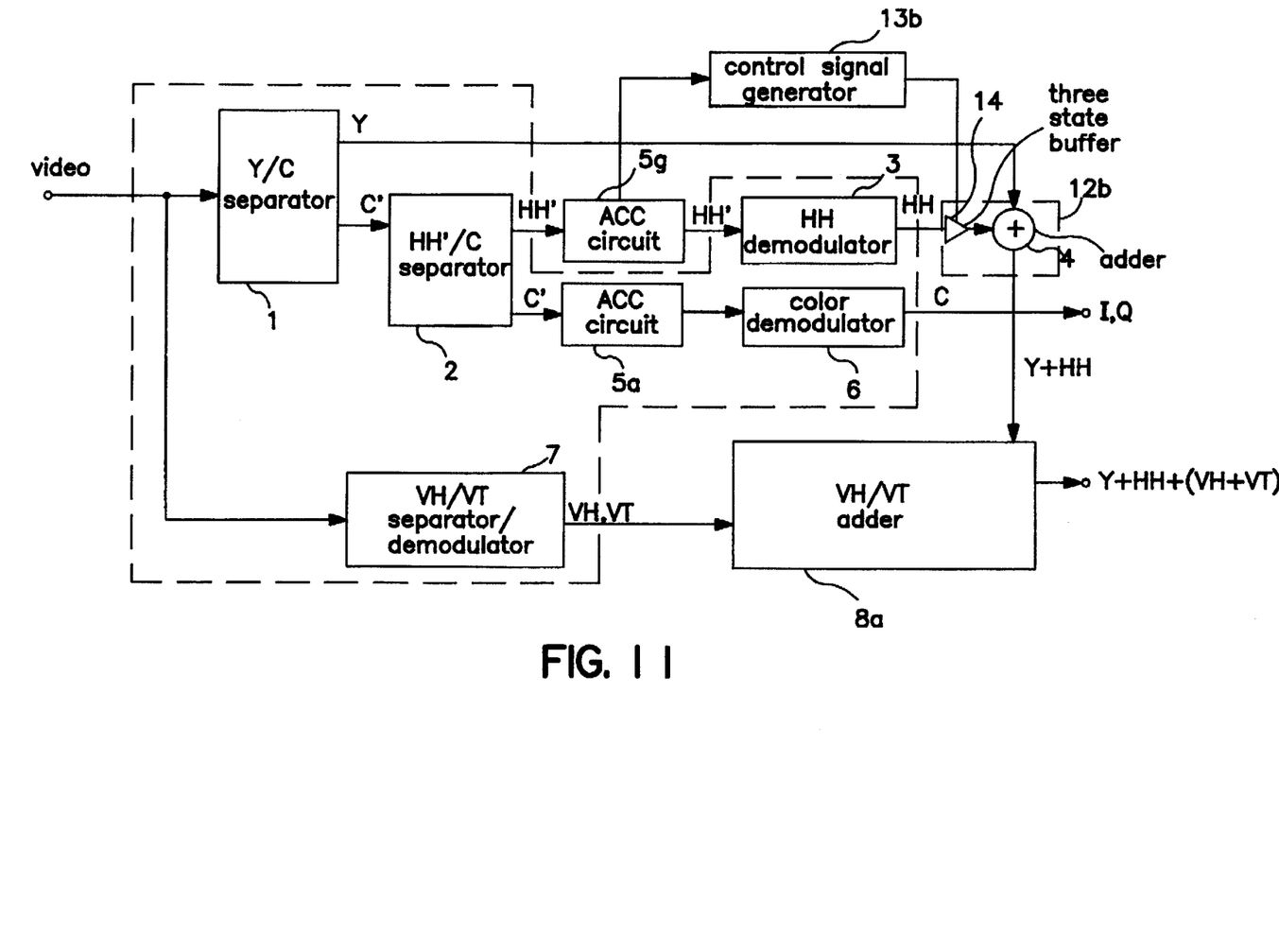
FIG. 11 is a block diagram of an example of separation/demodulation block of a video signal decoding apparatus in accordance with the eighth exemplary embodiment of the present invention.

FIG. 11 shows an example applying the seventh exemplary embodiment for the circuit configuration of the fourth exemplary embodiment shown in FIG. 5. An on/off action of the HH signal is executed by the control signal from a control signal generator 13b at a three-state-buffer 14. Instead of using a three-state-buffer 14, a superimposing ratio of the HH signal on the video signal may be varied by a control signal from control signal generator 13b.

(Nineth exemplary embodiment)

Figure 12:
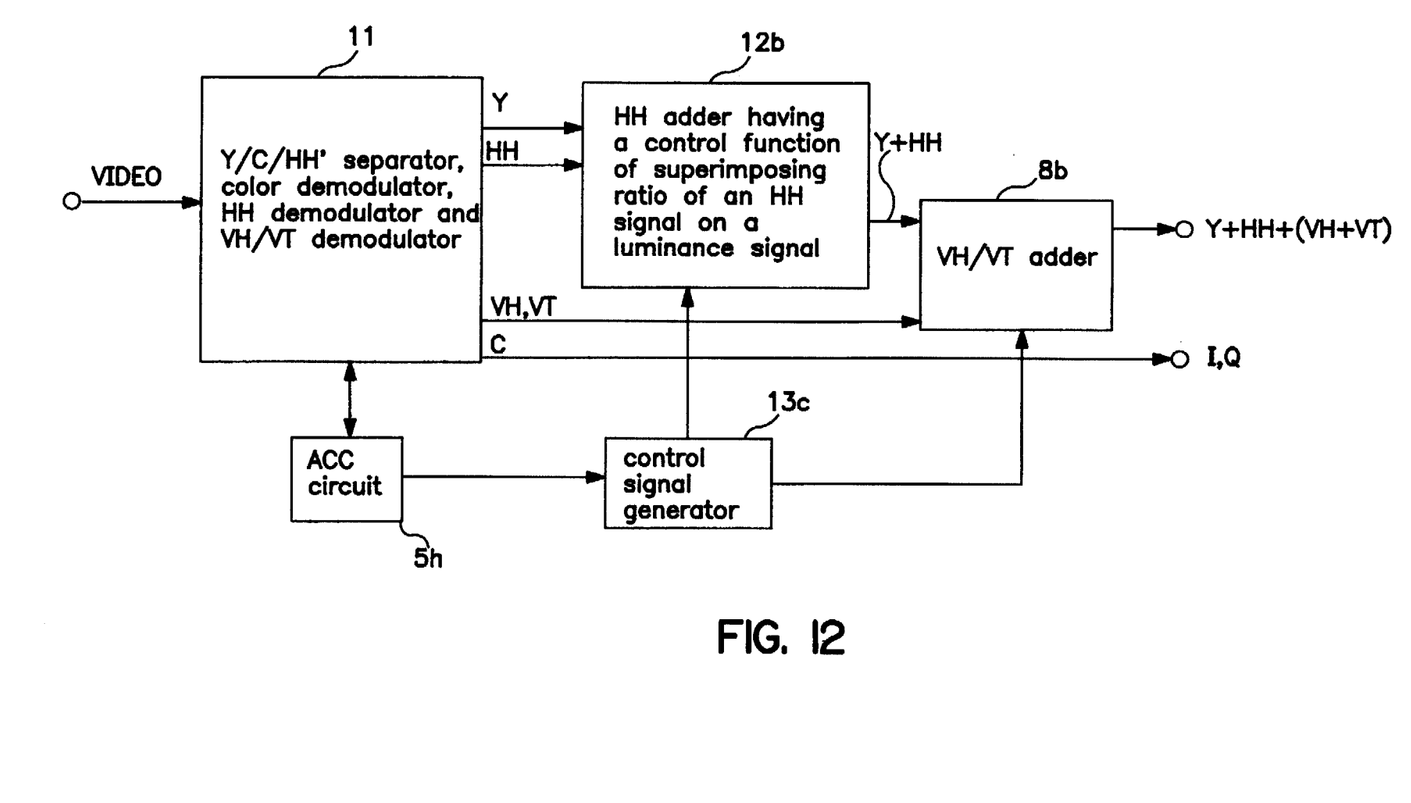
FIG. 12 is a block diagram of a video signal decoding apparatus in accordance with a nineth exemplary embodiment of the present invention.

It is possible to combine the seventh exemplary embodiment and the eighth exemplary embodiment and an example of this case is shown in FIG. 12.

Thus, in the case in which the levels of the HH signal and the VH and VT signals are almost same as the noise level due to bad receiving condition or the like. The apparatus judges to be difficult to reproduce an original signal and controls a superimposing ratio of the HH signal and the VH and VT signals on the video signal.

According to the present invention, an optimum picture can be obtained by detecting a color burst signal and automatically adjusting the amplitude of the HH signal or the VH and VT signals using a gain control signal proportional to the amplitude of the detected signal. When the receiving condition is bad and it is difficult to reproduce an original signal, the superimposing ratio of the HH signal or the VH and VT signals on the video signal can be controlled.

According to the first exemplary embodiment of the present invention, optimum VH and VT signals can be obtained by automatically adjusting the levels of the VH and VT signals multiplexed during an upper/lower non-picture period of the video signal at an ACC circuit even if the VH and VT signal levels vary due to receiving condition or the like.

According to the second exemplary embodiment of the present invention, optimum VH and VT signals can be obtained by automatically adjusting the VH and VT signal levels multiplexed during an upper/lower non-picture period of the video signal using a gain control signal from an ACC circuit used for a chrominance signal at a multiplier, even if the VH and VT signal levels vary due to receiving condition or the like. Moreover, the number of circuits can be reduced by using a common ACC circuit for amplitude adjustment of the VH and VT signals and for automatic color control.

According to the third exemplary embodiment of the present invention, optimum VH and VT signals can be obtained by selecting the chrominance signal during a picture period and the input video signal during an upper/lower non-picture period at switch circuit and inputting the selected signal to an ACC circuit, even if the VH and VT signal levels vary due to receiving condition or the like. Moreover, the number of circuits can be reduced by using a common ACC circuit for amplitude adjustment of the VH and VT signals and for automatic color control.

According to the fourth exemplary embodiment of the present invention, an optimum HH signal can be obtained by amplitude adjusting for an HH' signal at an ACC circuit, even if the HH signal level varies due to receiving condition or the like.

According to the fifth exemplary embodiment of the present invention, an optimum HH signal can be obtained by amplitude adjusting for both of a chrominance signal and an HH' signal at an ACC circuit, even if the HH signal level varies due to receiving condition or the like. Moreover, the number of circuits can be reduced by using a common ACC circuit for amplitude adjustment of the HH' signal and for automatic color control.

According to the seventh exemplary embodiment of the present invention, in the case in which the VH and VT signal levels are almost same as the noise level due to bad receiving condition or the like, the apparatus judges to be difficult to reproduce an original signal and can control a superimposing ratio of the VH and VT signals on the video signal by controlling a demodulating processing for the VH and VT signals by a control signal generated at a control signal generator according to a gain control signal from an ACC circuit.

According to the eighth exemplary embodiment of the present invention, in the case in which the level of the HH signal is almost same as the noise level due to bad receiving condition or the like, the apparatus judges to be difficult to reproduce an original signal and can control a superimposing ratio of the HH signal on the video signal by controlling decoding for the HH signal by a control signal generated at a control signal generator according to a gain control signal from an ACC circuit.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A video signal decoding apparatus comprising:
   (1) luminance signal/chrominance signal separation means for separating an input video signal into a luminance signal and a chrominance signal;
   (2) horizontal resolution helper signal/chrominance signal separation means for separating the chrominance signal coming from said luminance signal/chrominance signal separation means into a horizontal resolution helper signal for a luminance signal multiplexed on said chrominance signal at a conjugate position with the chrominance signal and a chrominance signal;
   (3) horizontal high frequency signal demodulation means for demodulating the horizontal resolution helper signal coming from said horizontal resolution helper signal/chrominance signal separation means into a horizontal high frequency signal;
   (4) adding means for superimposing the horizontal high frequency signal coming from said horizontal high frequency signal demodulation means on the luminance signal coming from said luminance signal/ chrominance signal separation means;
   (5) first automatic color control means for detecting a color burst signal included in the chrominance signal coming from said horizontal resolution helper signal/ chrominance signal separation means and for automatically adjusting the amplitude of the chrominance signal coming from said horizontal resolution helper signal/ chrominance signal separation means according to the amplitude of the detected color burst signal;
   (6) color demodulation means for demodulating the chrominance signal coming from said first automatic color control means and for outputting demodulated color signals;
   (7) second automatic color control means for detecting a color burst signal included in said input video signal and automatically adjusting the amplitude of a vertical high frequency signal and a vertical temporal resolution helper signal multiplexed during an upper/lower non-picture period of said input video signal according to the amplitude of the detected color burst signal;
   (8) vertical high frequency signal/vertical temporal resolution helper signal separation/demodulation means for separating and demodulating the output signal of said second automatic color control means into a vertical high frequency signal and a vertical temporal resolution helper signal multiplexed on the upper/lower non-picture period of said input video signal; and
   (9) vertical high frequency signal/vertical temporal resolution helper signal adding means for superimposing a vertical high frequency signal and a vertical temporal resolution helper signal coming from said vertical high frequency signal/vertical temporal resolution helper signal separation/demodulation means on the luminance signal coming from said adder means and superimposing with a horizontal high frequency signal and for outputting a luminance signal with enhanced resolution both in horizontal and vertical.

2. A video signal decoding apparatus comprising:
   (1) luminance signal/chrominance signal separation means for separating an input video signal into a luminance signal and a chrominance signal;
   (2) horizontal resolution helper signal/chrominance signal separation means for separating the chrominance signal coming from said luminance signal/chrominance signal separation means into a horizontal resolution helper signal for a luminance signal multiplexed on the chrominance signal at a conjugate position with the chrominance signal and a chrominance signal;
   (3) horizontal high frequency signal demodulation means for demodulating the horizontal resolution helper signal coming from said horizontal resolution helper signal/chrominance signal separation means into a horizontal high frequency signal;
   (4) adding means for superimposing the horizontal high frequency signal coming from said horizontal high frequency signal demodulation means on the luminance signal coming from said luminance signal/ chrominance signal separation means;
   (5) automatic color control means for detecting a color burst signal included in the chrominance signal coming from said horizontal resolution helper signal/ chrominance signal separation means, for automatically adjusting the amplitude of the chrominance signal coming from said horizontal resolution helper signal/ chrominance signal separation means according to the amplitude of the detected color burst signal and for generating a gain control signal which amplitude is proportional to the amplitude of the detected color burst signal;
   (6) color demodulation means for demodulating the chrominance signal coming from said automatic color control means and for outputting demodulated color signals;
   (7) multiplying means for adjusting the amplitudes of a vertical high frequency signal and a vertical temporal resolution helper signal multiplexed during an upper/ lower non-picture period of said input video signal using a gain control signal coming from said automatic color control means;
   (8) vertical high frequency signal/vertical temporal resolution helper signal separation/demodulation means for separating and demodulating a vertical high frequency signal and a vertical temporal resolution helper signal multiplexed during an upper/lower non-picture period of said input video signal using an output of said multiplying means; and
   (9) vertical high frequency signal/vertical temporal resolution helper signal adding means for superimposing the vertical high frequency signal and the vertical temporal resolution helper signal coming from said vertical high frequency signal/vertical temporal resolution helper signal separation/demodulation means on the luminance signal coming from said adding means and superimposing with the horizontal high frequency signal and for outputting a luminance signal with enhanced resolution both in horizontal and vertical.

3. A video signal decoding apparatus comprising:
   (1) luminance signal/chrominance signal separation means for separating an input video signal into a luminance signal and a chrominance signal;
   (2) horizontal resolution helper signal/chrominance signal separation means for separating the chrominance signal coming from said luminance signal/chrominance signal separation means into a horizontal resolution helper signal and a chrominance signal;
   (3) horizontal high frequency signal demodulation means for demodulating the horizontal resolution helper signal coming from said horizontal resolution helper signal/chrominance signal separation means into a horizontal high frequency signal;

(4) adding means for superimposing the horizontal high frequency signal coming from said horizontal high frequency signal demodulation means on the luminance signal coming from said luminance signal/chrominance signal separation means;

(5) switching means for switching the chrominance signal coming from said horizontal resolution helper signal/chrominance signal separation means and said input video signal;

(6) automatic color control means for detecting a color burst signal included in the signals from said switching means and for automatically adjusting the amplitude of the input signals according to the amplitude of the detected color burst signal;

(7) color demodulation means for demodulating the chrominance signal coming from said automatic color control means and for outputting demodulated color signals;

(8) vertical high frequency signal/vertical temporal resolution helper signal separation/demodulation means for separating and demodulating a vertical high frequency signal and a vertical temporal resolution helper signal coming from said automatic color control means and multiplexed during an upper/lower non-picture period of said input video signal; and (9) vertical high frequency signal/vertical temporal resolution helper signal adding means for superimposing the vertical high frequency signal and the vertical temporal resolution helper signal coming from said vertical high frequency signal/vertical temporal resolution helper signal separation/demodulation means on the luminance signal coming from said adding means and superimposing with the horizontal high frequency signal and for outputting a luminance signal with enhanced resolution both in horizontal and vertical.

4. A video signal decoding apparatus comprising:

(1) luminance signal/chrominance signal separation means for separating an input video signal into a luminance signal and a chrominance signal;

(2) horizontal resolution helper signal/chrominance signal separation means for separating the chrominance signal coming from said luminance signal/chrominance signal separation means into a horizontal resolution helper signal and a chrominance signal;

(3) first automatic color control means for detecting a color burst signal included in the horizontal resolution helper signal coming from said horizontal resolution helper signal/chrominance signal separation means and for automatically adjusting the amplitude of the horizontal resolution helper signal according to the amplitude of the detected color burst signal;

(4) horizontal high frequency signal demodulation means for demodulating the horizontal resolution helper signal coming from said first automatic color control means into a horizontal high frequency signal;

(5) adding means for superimposing a horizontal high frequency signal coming from said horizontal high frequency signal demodulation means on the luminance signal coming from said luminance signal/chrominance signal separation means;

(6) second automatic color control means for detecting a color burst signal included in the chrominance signal coming from said horizontal high frequency signal/chrominance signal separation means and for automatically adjusting the amplitude of said chrominance signal according to the amplitude of the detected color burst signal;

(7) color demodulation means for demodulating the chrominance signal coming from said second automatic color control means and for outputting demodulated color signals;

(8) vertical high frequency signal/vertical temporal resolution helper signal separation/demodulation means for separating and demodulating said input video signal into a vertical high frequency signal and a vertical temporal resolution helper signal multiplexed during an upper/lower non-picture period of the video signal; and (9) vertical high frequency signal/vertical temporal resolution helper signal adding means for superimposing the vertical high frequency signal and the vertical temporal resolution helper signal coming from said vertical high frequency signal/vertical temporal resolution helper signal separation/demodulation means on the luminance signal coming from said adding means and superimposing with the horizontal high frequency signal and for outputting a luminance signal with enhanced resolution both in horizontal and vertical.

5. A video signal decoding apparatus comprising:

(1) luminance signal/chrominance signal separation means for separating an input video signal into a luminance signal and a chrominance signal;

(2) automatic color control means for detecting a color burst signal from the chrominance signal coming from said luminance signal/chrominance signal separation means and for automatically adjusting the amplitude of the chrominance signal according to the amplitude of the detected color burst signal;

(3) horizontal resolution helper signal/chrominance signal separation means for separating the chrominance signal coming from said automatic color control means into a horizontal resolution helper signal and a chrominance signal;

(4) horizontal high frequency signal demodulation means for demodulating said separated horizontal resolution helper signal into a horizontal high frequency signal;

(5) adding means for superimposing the horizontal high frequency signal coming from said horizontal high frequency signal demodulation means on the luminance signal coming from said luminance signal/chrominance signal separation means;

(6) color demodulation means for demodulating the chrominance signal coming from said horizontal resolution helper signal/chrominance signal separation means and for outputting demodulated color signals;

(7) vertical high frequency signal/vertical temporal resolution helper signal separation/demodulation means for separating and demodulating said input video signal into a vertical high frequency signal and a vertical temporal resolution helper signal multiplexed during an upper/lower non-picture period of the input video signal; and (8) vertical high frequency signal/vertical temporal resolution helper signal adding means for superimposing the vertical high frequency signal and the vertical temporal resolution helper signal coming from said vertical high frequency signal/vertical temporal resolution helper signal separation/demodulation means on the luminance signal coming from said adding means and superimposing with the horizontal high frequency signal and for outputting a luminance signal with enhanced resolution both in horizontal and vertical.

6. A video signal decoding apparatus comprising:

(1) separation/demodulation means for separating an input video signal into a luminance signal, a chrominance signal, a horizontal resolution helper signal, a vertical resolution helper signal and a vertical temporal resolution helper signal, for demodulating the separated horizontal resolution helper signal into a horizontal high frequency signal, for detecting a color burst signal from the separated chrominance signal, automatically adjusting an amplitude of the chrominance signal according to the amplitude of the detected color burst signal, color demodulating and outputting demodulated color signals, and for demodulating the amplitude adjusted chrominance signal returned from a post-described automatic color control means into a vertical resolution helper signal and a vertical temporal resolution helper signal and outputting demodulated signals;

(2) horizontal high frequency signal adding means for superposing said horizontal high frequency signal coming from said separation/demodulation means on the luminance signal coming from said separation/demodulation means;

(3) automatic color control means for detecting a color burst signal included in the chrominance signal coming from said separation/demodulation means, for automatically adjusting an amplitude of said chrominance signal according to the amplitude of the detected color burst signal for returning the amplitude adjusted chrominance signal to said separation/demodulation means again and for outputting a gain control signal which amplitude is proportional to the amplitude of said detected color burst signal;

(4) control signal generating means for generating a control signal by said gain control signal coming from said automatic color control means; and (5) vertical high frequency signal/vertical temporal resolution helper signal adding means for superimposing the vertical high frequency signal and the vertical temporal resolution helper signal coming from said separation/demodulation means on the luminance signal coming from said horizontal high frequency signal adding means and superimposing with the horizontal high frequency signal and for outputting a luminance signal in which horizontal resolution is enhanced with a fixed rate and vertical resolution is adequately enhanced by a control signal coming from said control signal generating means.

7. A video signal decoding apparatus comprising:

(1) separation/demodulation means for separating an input video signal into a luminance signal, a chrominance signal, a horizontal resolution helper signal, a vertical resolution helper signal and a vertical temporal resolution helper signal, for demodulating the separated horizontal resolution helper signal into a horizontal high frequency signal, for detecting a color burst signal from the separated chrominance signal, automatically adjusting an amplitude of the chrominance signal according to the amplitude of the detected color burst signal, color demodulating and outputting demodulated color signals, and for demodulating the amplitude adjusted chrominance signal returned from a post-described automatic color control means into a vertical resolution helper signal and a vertical temporal resolution helper signal and outputting demodulated signals;

(2) horizontal high frequency signal adding means for superposing said horizontal high frequency signal coming from said separation/demodulation means on the luminance signal coming from said separation/demodulation means;

(3) automatic color control means for detecting a color burst signal included in the chrominance signal coming from said separation/demodulation means, for automatically adjusting an amplitude of said chrominance signal according to the amplitude of the detected color burst signal for returning the amplitude adjusted chrominance signal to said separation/demodulation means again and for outputting a gain control signal which amplitude is proportional to the amplitude of said detected color burst signal;

(4) control signal generating means for generating a control signal by said gain control signal coming from said automatic color control means; and (5) vertical high frequency signal/vertical temporal resolution helper signal adding means for superimposing the vertical high frequency signal and the vertical temporal resolution helper signal coming from said separation/demodulation means on the luminance signal coming from said horizontal high frequency signal adding means and superimposing with the horizontal high frequency signal with an adequate ratio and for outputting a luminance signal in which vertical resolution is enhanced with a fixed rate and horizontal resolution is adequately enhanced by a control signal coming from said control signal generating means.

* * * * *